United States Patent [19]

Shiratsuchi

[11] Patent Number: 4,774,581
[45] Date of Patent: Sep. 27, 1988

[54] TELEVISION PICTURE ZOOM SYSTEM

[75] Inventor: Shinichi Shiratsuchi, Yokohama, Japan

[73] Assignee: RCA Licensing Corporation, Princeton, N.J.

[21] Appl. No.: 38,260

[22] Filed: Apr. 14, 1987

[51] Int. Cl.⁴ .................... H04N 1/393; H04N 5/262
[52] U.S. Cl. .................................. 358/180; 358/287; 382/47
[58] Field of Search ................ 358/180, 22, 140, 287; 382/47

Primary Examiner—Tommy P. Chin
Attorney, Agent, or Firm—Paul J. Rasmussen; Eric P. Herrmann; Kenneth N. Nigon

[57] ABSTRACT

A digital video zoom system includes circuitry for writing image samples into a memory at a standard rate and for reading samples from the memory at a reduced rate. Samples are read from the memory under control of a digital accumulator which repeatedly adds a value N to a stored value, modulo M, to obtain a new stored value. Samples are read from the memory only when an overflow condition is detected in the accumulator. The four most significant bits of the value held by the accumulator are also used to develop interpolation factors which are used to combine successive sample values provided by the memory to develop interpolated sample values which are used to produce the enlarged image. The image is increased in size by a factor of M/N relative to an unmagnified image.

7 Claims, 9 Drawing Sheets

FIELD MEMORY

CHROMINANCE VERTICAL INTERPOLATOR

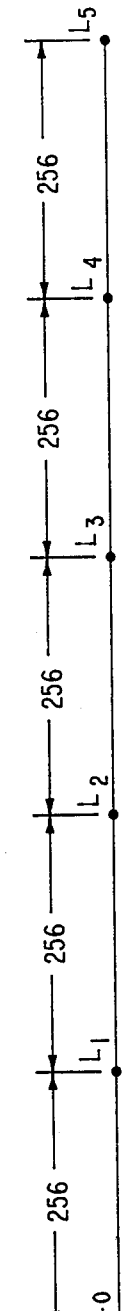
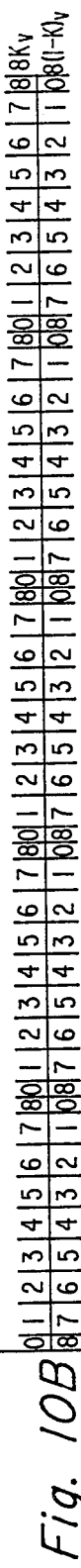
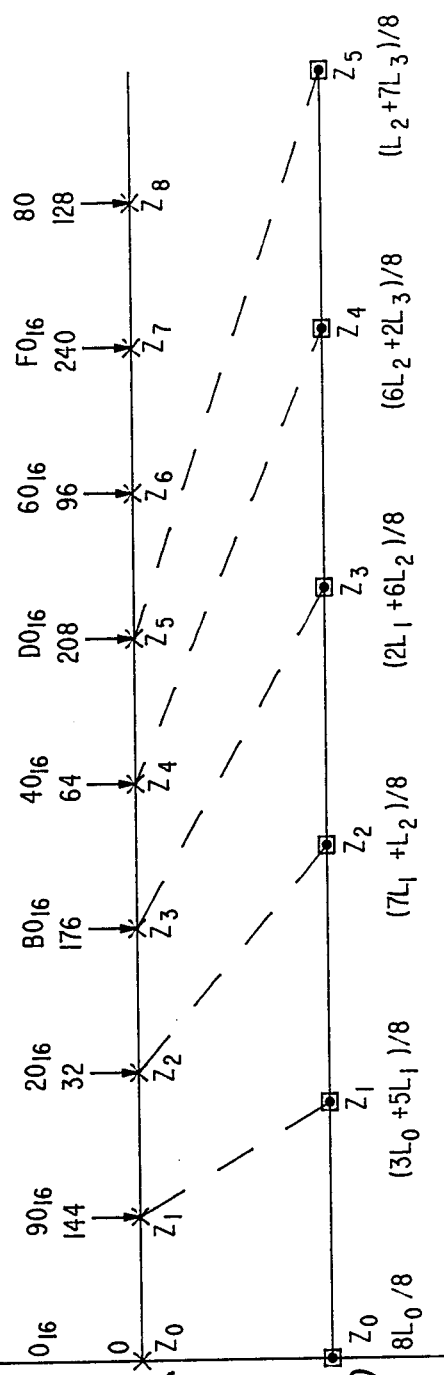
Fig. 10A  Fig. 10B  Fig. 10C  Fig. 10D

TELEVISION PICTURE ZOOM SYSTEM

The present invention relates to circuitry which allows an active video image to be magnified by a stepwise continuous set of factors to produce a zoom effect.

The recent progress in digital video signal processing has led to the proposal of several television picture zoom systems. In one of these systems, set forth in U.S. Pat. No. 4,528,585 which is hereby incorporated by reference, a portion of a video image may be magnified by a factor of 2, 4 or 8 and displayed as an inset in the unmagnified video image. A second system, set forth in U.S. Pat. No. 4,302,776 which is hereby incorporated by reference, allows for stepwise continuous magnification factors to produce a zoom effect but does not magnify, the image in real time; only stored, frozen images may be magnified. In addition, this second system interpolates five consecutive samples to obtain each sample of the magnified image. Interpolating this large a number of samples may undesirably reduce the apparent resolution of the reproduced image.

SUMMARY OF THE INVENTION

The present invention is embodied in a television picture magnification system in which a video image may be magnified in real time. The circuitry which magnifies the image includes a memory that holds digital samples representing successive portions of the image to be magnified. A value of N is repeatedly added, by the circuitry, in a modulo M accumulator, where the selected magnification factor may be represented by the fraction M/N. The value of the sum generated by the accumulator determines when a new portion of the video signal is to be provided by the memory.

BRIEF DESCRIPTION OF THE DRAWING

FIGS. 10A through 10D are timing diagrams useful for explaining the function of the zoom feature incorporated in the video signal processing circuitry shown in FIG. 1.

DETAILED DESCRIPTION

Figure 1:
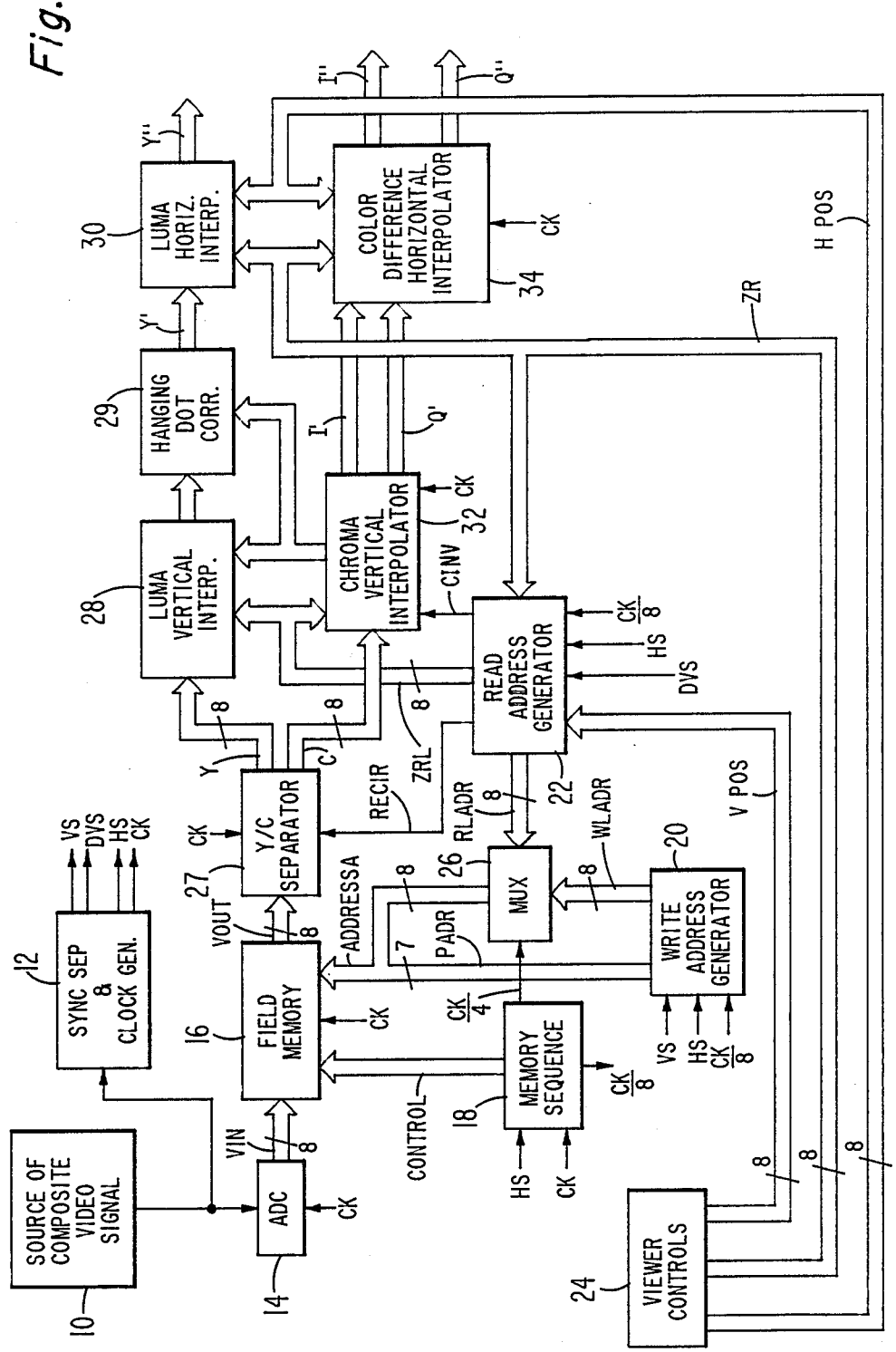
FIG. 1 is a block diagram showing video signal processing circuitry which includes a zoom feature incorporating the present invention.

In the drawings, broad arrows represent busses for conveying multiple-bit parallel digital signals. Line arrows represent connections for conveying analog signals or single-bit digital signals. Depending on the processing speed of the devices used, compensating delays may be required in certain of the signal paths. One skilled in the art of digital video signal processing circuit design would know where such delays would be needed in a particular system.

The video signal processing circuitry shown in FIG. 1 includes apparatus to perform a picture zoom function which allows video images to be magnified in real time using 128 magnification factors between one-to-one and two-to-one. Using a magnification factor of two-to-one, a portion of the original image occupying one-quarter of the display screen may be enlarged to occupy the entire screen.

The following is a brief description of the various structural elements shown in FIG. 1. This is followed by a more detailed description which refers to FIGS. 2–10.

Digital sampled data composite video signals provided by an analog-to-digital converter (ADC) 14 are loaded into data storage elements of a field memory 16 that are addressed by write address values provided by a write address generator 20. The memory 16 provides previously stored, sampled data composite video signals from data storage elements addressed by read address values provided by a read address generator 22. The read address generator 22 is controlled by a vertical position signal VPOS provided by viewer controls 24. The signal VPOS conditions the memory 16 to provide only those lines of samples that lie within the portion of the image that is to be magnified. The sampled data composite video signal provided by the memory 16 is applied to luminance/chrominance separation circuitry 27. The circuitry 27 separates a luminance signal component Y, and a combed chrominance signal component, C, from the sampled data composite video signal. The luminance signal, Y, is expanded in the vertical direction by luminance signal vertical interpolation circuitry 28 using vertical interpolation factors ZRL. The factors ZRL are developed by the read address generator 22 from a magnification factor or zoom ratio, ZR, provided via the viewer controls 24. The vertically expanded luminance signal, provided by the interpolation circuitry 28, is applied to hanging dot correction circuitry 29, the output signal, Y, of which is expanded in the horizontal direction by luminance signal horizontal interpolation circuitry 30. The circuitry 30 interpolates only those samples occurring after a specified horizontal position, HPOS, provided via the viewer controls 24, to expand the lines of samples consistent with the zoom ratio ZR.

The combed chrominance signal C provided by the separation circuitry 27 is expanded vertically by chrominance signal vertical interpolation circuitry 32, which also separates the chrominance signal into two quadrature phase related color difference signals, for example, I and Q. The vertically expanded color difference signals, I' and Q', provided by the circuitry 32 are expanded horizontally by color difference signal horizontal interpolation circuitry 34. The signals I" and Q" provided by the circuitry 34 and the signal Y" provided by the luminance signal horizontal interpolation circuitry 30 may, for example, be applied to conventional color difference and luminance signal processing circuitry (not shown) to produce a magnified image.

The following is a more detailed description of the video signal processing circuitry shown in FIG. 1. A source of composite video signal 10, which may, for example, be the tuner, IF amplifier and video detector of a conventional color television receiver, provides a composite video signal to the ADC 14 and to sync separator and clock generator circuitry 12. The circuitry 12, which may be of conventional design, processes the composite video signals to produce a horizontal synchronization signal, HS, and a vertical synchronization signal, VS. In addition, the sync separator and clock generator 12 includes circuitry (not shown) which delays the signal VS by 128 horizontal line periods to produce a delayed vertical synchronization signal, DVS. The vertical deflection circuitry (not shown) of the video signal processing system which includes this circuitry, is responsive to the signal DVS for producing the magnified display. The circuitry 12 may also include a conventional burst-locked phase locked loop (not shown) which develops a clock signal, CK, having a frequency $4f_c$, which is four times the frequency, $f_c$, of the color subcarrier component of the composite video signal.

The ADC 14, which may, for example, be a conventional flash-type ADC, samples and digitizes the composite video signals applied to its input port at instants determined by the $4f_c$ clock signal CK. The signal VIN provided by the ADC 14 is applied to the input port of the field memory 16.

Externally, the field memory 16 appears to be a dual-port memory able to accept and provide continuous streams of eight-bit pixel values at a $4f_c$ rate. The address values applied to the address input bus, ADDRESSA, of the memory 16 may be time division multiplexed to store a first stream of pixel data at one sequence of address values and simultaneously retrieve a second stream of pixel data using another sequence of address values. The field memory 16 is responsive to control signals provided by memory sequencing circuitry 18 as set forth below.

Figure 2:
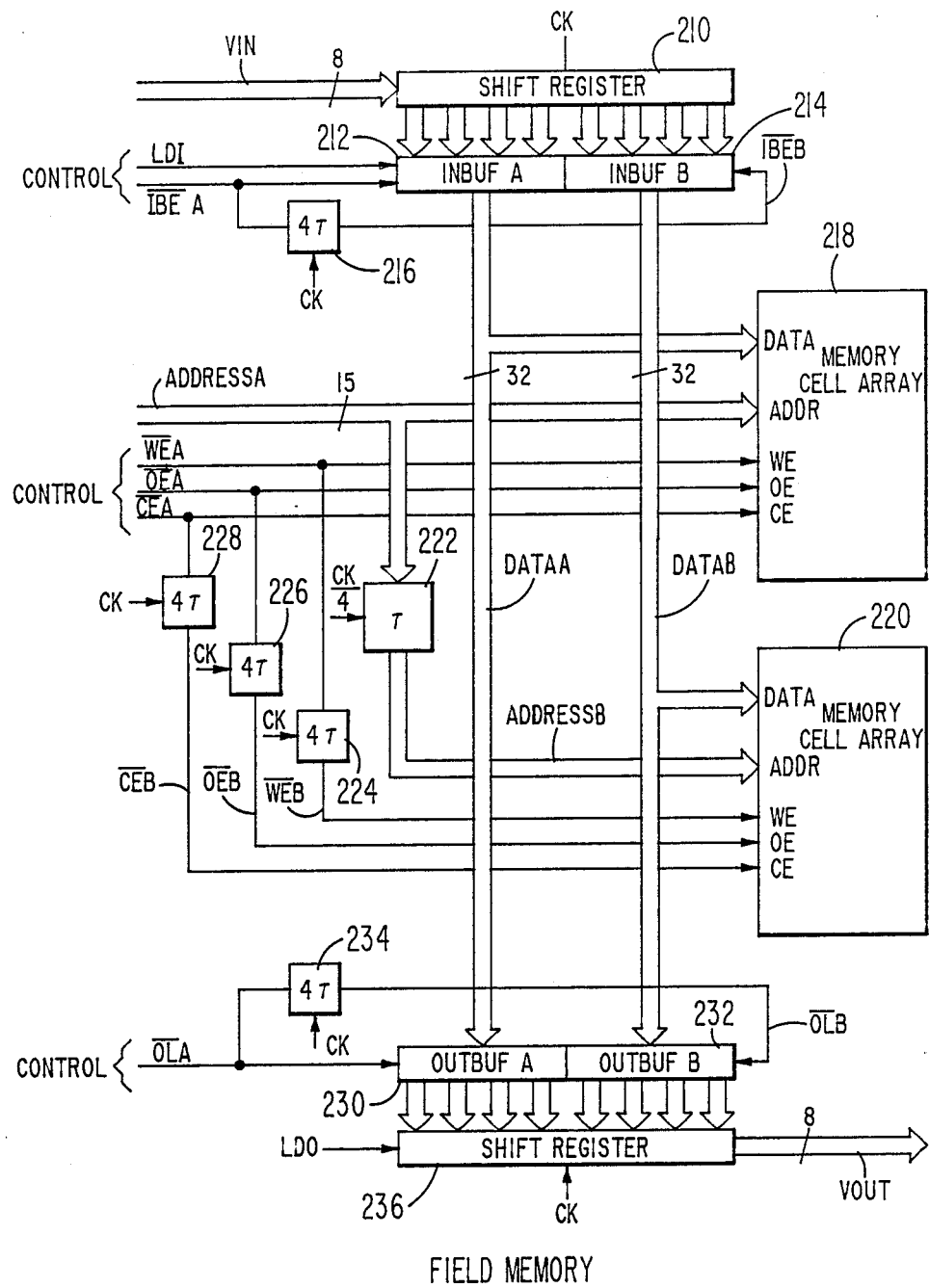
FIG. 2 is a block diagram of field memory circuitry suitable for use in the video signal processing circuitry shown in FIG. 1.

FIG. 2 is a block diagram of circuitry suitable for use as the field memory 16. This is a pipelined and interleaved memory system. Pixel data values (i.e., samples provided by the ADC 14) are stored either in memory cell array 218 or memory cell array 220. Each of the memory cell arrays 218 and 220 may include, for example, four 32K×8 bit random access memory (RAM) integrated circuits (IC's) such as the HM65256AP manufactured by Hitachi. The memory IC's in each of the memory cell arrays 218 and 220 are configured to have mutually interconnected address and control input terminals but separate data input terminals. The combination of the 4 IC's appears as a memory cell array having 32,768 addressable blocks where each block includes four data storage elements for holding, respectively, four eight-bit pixel values. In order to maintain continuous input and output data streams, the data read and data write operations to the memory cell arrays 218 and 220 are interleaved; while data is being written into the memory cell array 218 data is being read from the memory cell array 220 and vice-versa. In general, this interleaving is achieved by dividing the field memory into two sections, A and B. The address and control signals applied to section B are delayed by four periods of the clock signal CK relative to the corresponding address and control signals applied to section A. Consequently, while a read operation, using a first address value is in progress in section B of the memory, a write operation using a second address value may be in progress in section A. Four clock periods later, a write operation using a third address value is performed on section A of the memory while the read operation using the second address value is performed on section B of the memory. In the system shown in FIG. 2, the input buffer 212, memory cell array 218 and output buffer 230 are in section A and the input buffer 214, memory cell array 220 and output buffer 232 are in section B.

Figure 3:
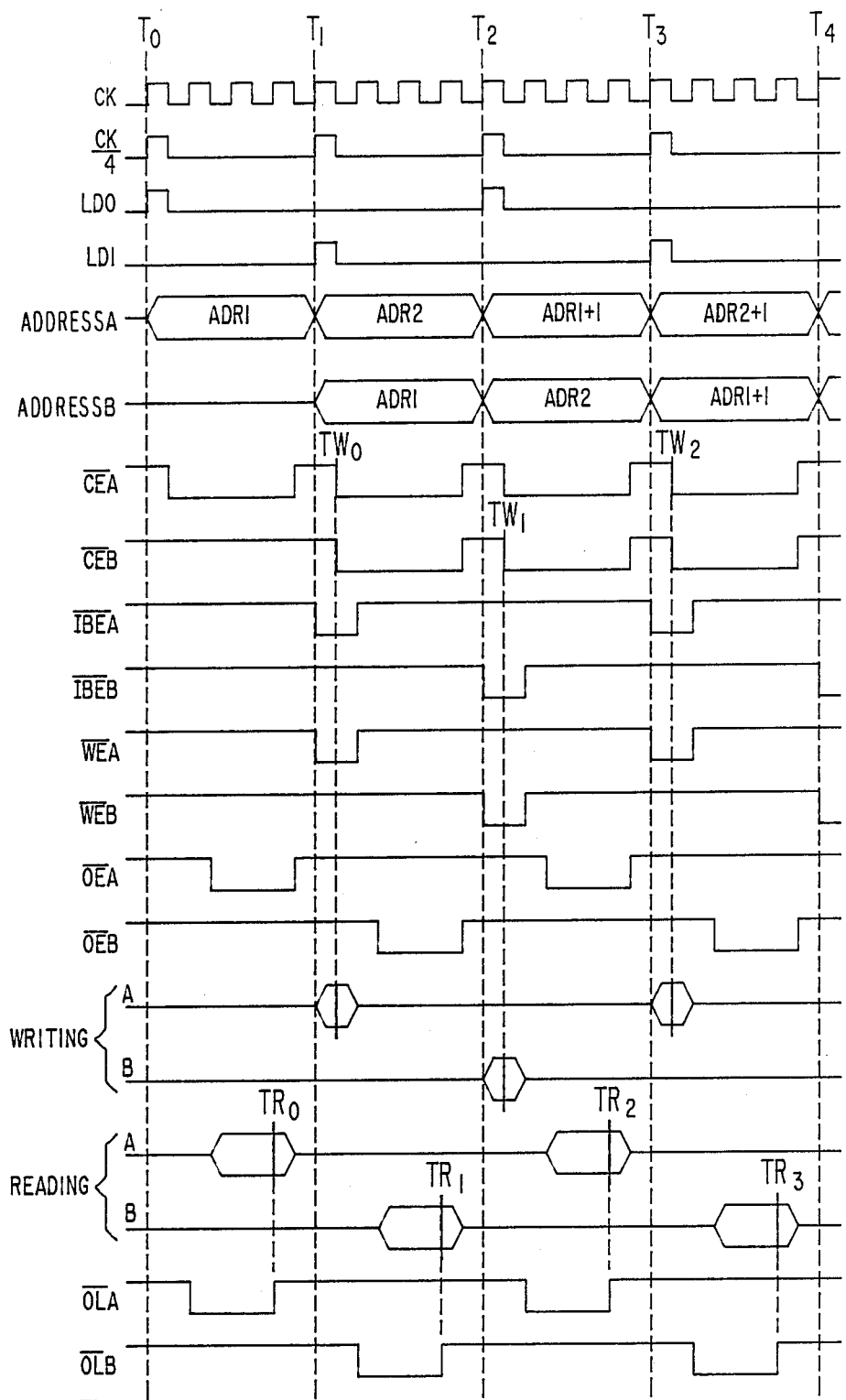
FIG. 3 is a timing diagram useful for describing the operation of the field memory shown in FIG. 2.

The structure and operation of the field memory circuitry shown in FIG. 2 is described using the timing diagrams shown in FIG. 3, which illustrate the operation of the memory sequencing circuitry 18. In the example shown in FIG. 3, the memory cell arrays 218 and 220 contain pixel data in blocks having addresses ADR1 and ADR1+1. Four pixel values of a block of data to be written into the memory cell arrays 218 and 220 have been applied to the shift register 210 at time $T_0$, and the buffer registers 230 and 232 contain a block of pixel data read from the memory cell arrays 218 and 220 using the address value ADR1-1.

The first operation is a memory read using address ADR1. At time $T_0$, the memory sequencing circuitry 18 pulses the signal LDO to transfer the block of pixel data held in the buffer registers 230 and 232, in parallel, into the output shift register 236. These pixel values are provided sequentially by the shift register 236 synchronous with the negative going edges of eight successive pulses of the signal CK. Also at time $T_0$, the address value ADR1 is applied to the ADDRESSA input port of the field memory 16. One-half of one period of the clock signal CK following time $T_0$, the chip enable signal $\overline{CEA}$, provided by the memory sequencing circuitry 18, is brought low, enabling the memory cell array 218. One clock period after time $T_0$, the signal $\overline{OLA}$, provided by the circuitry 18 is brought low, gating the input port of the buffer register 230 onto the bus DATAA. At a time one and one-half periods of the signal CK after time $T_0$, the memory sequencing circuitry 18 brings the output enable signal $\overline{OEA}$ low. This step in the memory read operation, enables the memory cell array 218 to apply the contents of the block of pixel data having the address ADR1 to the bus DATAA. Three clock periods after $T_0$, the memory sequencing circuitry 18 brings the signal $\overline{OLA}$ high to latch the pixel data applied to the bus DATAA into the buffer register 230. Three and one-half clock cycles after time $T_0$, the memory cell array 218 is disabled by bringing the signal $\overline{CEA}$ high and the memory read operation is complete.

The address signal ADDRESSB, chip enable signal $\overline{CEB}$, output enable signal $\overline{OEB}$ and output buffer load signal OLB are generated by delaying the corresponding signals ADDRESSA, $\overline{CEA}$, $\overline{OEA}$ and $\overline{OLA}$ by four periods of the clock signal CK in the respective delay elements 222, 228, 226 and 234. Consequently, the memory read operation which read four pixel values from memory cell array 218 between times $T_0$ and $T_1$ is repeated on the memory cell array 220 between times $T_1$ and $T_2$. At time $T_2$, the eight pixel values, having the address ADR1, four from the memory cell array 218 and four from the memory cell array 220, are in the respective buffer registers 230 and 232. At time $T_2$, the signal LDO is pulsed by the circuitry 18 to transfer these eight pixel values, in parallel, to the shift register 236. The shift register 236 provides these pixel values sequentially for eight periods of the signal CK following time $T_2$.

A memory write operation using memory cell array 218 begins at time $T_1$. The eighth input pixel value is shifted into the input shift register 21 immediately to the time $T_1$. At time $T_1$, the memory sequencing circuitry 18 pulses the signal LDI to transfer the eight pixel values held in the shift register 210 into the buffer registers 212 and 214. At time $T_1$, the memory sequencing circuitry begins to write the four pixel values held in the register 212 into the memory cell array 218. The address value ADR2, to be used to store these four pixel values, is applied to the address input port ADDRESSA of the field memory 16 at line $T_1$. Also at time $T_1$, the memory sequencing circuitry 18 changes the input buffer enable signal $\overline{IBEA}$ and the write enable signal $\overline{WEA}$ to be logic zero. These signals respectively gate the values held in the input buffer 212 onto the bus DATAA and enable the memory cell array 218 to load the values on the bus DATAA into the addressed block. One-half of one period of the signal CK after time $T_1$, the signal $\overline{CEA}$ is changed to logic zero by the circuitry 18, enabling the memory cell array 218 and, so, enabling the write operation to occur. At the time $TW_0$, the four pixel values held in the input buffer register 212 have stabilized in the block of the memory cell array 218 which has the address ADR2. One period of the clock signal CK after time $T_1$, the circuitry 18 changes the signals $\overline{IBEA}$ and $\overline{WEA}$ to have values of logic one ending the memory write operation. Three and one-half clock periods after time $T_1$, the circuitry 18 changes the chip enable signal $\overline{CEA}$ to a logic one, ending the memory write cycle.

The signals $\overline{IBEB}$ and $\overline{WEB}$ are generated by delaying the corresponding signals $\overline{IBEA}$ and $\overline{WEA}$ by four periods of the signal CK in the respective delay elements 216 and 224. These signals, combined with the delayed address signal ADDRESSB and delayed chip enable signal $\overline{CEB}$ cause the memory write operation using the address value ADR2 to be repeated on the memory cell array 220 between time $T_2$ and time $T_3$. During this write operation, the four pixel values held in the buffer register 214 are transferred to the block of pixel storage cells in the memory cell array 220 that has the address value ADR2.

Coincident with this second write operation using the memory cell array 220, a memory read operation is performed, using the memory cell array 218. During the time interval between time $T_2$ and time $T_3$, four pixel values from a block of storage cells having the address ADR1+1 are read from the cell array 218 and loaded into the output buffer 230. This read operation is identical to the read operation performed between time $T_0$ and time $T_1$ and is not described in detail.

In the time interval between times $T_3$ and $T_4$, a memory write operation, using an address value ADR2+1, writes the four pixel values, applied to the field memory 16 between times $T_2$ and $T_3$, into the memory cell array 218. Also between time $T_3$ and time $T_4$, four pixel values are read from the memory cell array 220 at the address ADR1+1 and are transferred to the output buffer register 232. These memory write and memory read operations are performed in the same manner as those described above and are not described in detail herein.

The memory sequencing circuitry 18 is responsive to the clock signal CK to generate the signals $\overline{IBEA}$, $\overline{WEA}$, $\overline{OEA}$, $\overline{CEA}$, $\overline{OLA}$, LDO and LDI. The circuitry 18 is reset at the beginning of each horizontal line of samples by the horizontal synchronization signal HS, provided by the sync separator and clock generator circuitry 12. This ensures that the first sample in any given line is stored in the field memory 16 on a block boundary. One skilled in the art of digital signal processing circuit design will be readily able to build suitable memory sequencing circuitry 18 from the description set forth above in reference to FIGS. 1, 2 and 3. Accordingly, the memory sequencing circuitry 18 is not described in detail herein.

The address values applied to the field memory 16 have two parts, a line address, the eight most significant bits (MSB's), and a pixel block address, the seven least significant bits (LSB's). The line address values correspond to the 256 lines of video samples which may be written to or read from the memory 16 during one field interval. The pixel block address values correspond to the positions of successive blocks of eight pixel values on a horizontal line of the video image. The combination of a line address value and a pixel block address value points to a particular block of pixel storage cells in the field memory 16.

The pixel block address signal, PADR, and a line address signal, WLADR, that is used to write data into the field memory 16, are generated by the write address generator 20. The generator 20 may include, for example, two counters (not shown). The first counter is reset by the vertical synchronization signal, VS, and incremented by the horizontal synchronization signal, HS. The count value provided by this first counter is the write-line address signal WLADR. The second counter is reset by the signal HS and incremented by a signal CK/8 having a frequency that is one-eighth the frequency of the signal CK. The signal CK/8 is generated by the memory sequencing circuitry 18 and may correspond for example, to the signal LDO shown in FIG. 3. This second counter produces the pixel block address signal which is used both for reading data from and writing data into the field memory 16.

The write-line address signal WLADR and a read line address signal RLADR, provided by the read address generator 22, are applied to respective first and second input ports of a multiplexer 26. The multiplexer 26 is controlled by a signal CK/4, having a frequency that is one-fourth of the frequency of the signal CK. The signal CK/4 is provided by the memory sequencing circuitry 18 and is shown in the timing diagrams of FIG. 3. The eight-bit signal provided by the multiplexer 26 forms the eight MSB's of the address signal, ADDRESSA, applied to the field memory 16. The pixel block address signal, PADR, forms the seven LSB's of the signal ADDRESSA. In the present embodiment of the invention, the pixel block address portion of the signal ADDRESSA changes every eight periods of the clock signal CK to address successive blocks of pixel values in a horizontal line. The line address portion of the signal ADDRESSA changes every four periods of the signal CK, alternating between a line address value to be used to write data into the memory 16 and a line address value to be used to read data from the memory 16.

Figure 4:
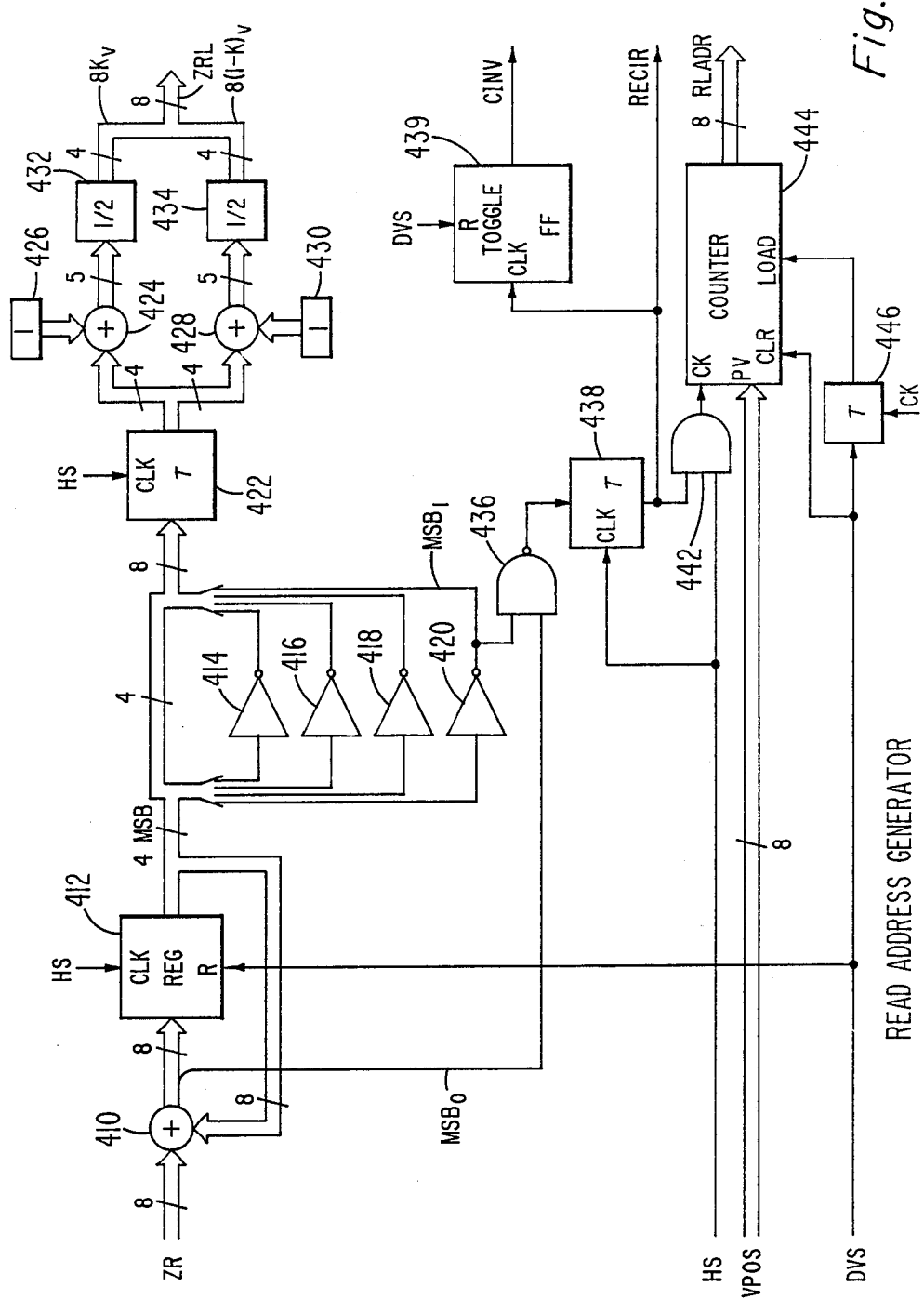
FIG. 4 is a block diagram of a read address generator suitable for use in the video signal processing circuitry shown in FIG. 1.

FIG. 4 is a block diagram of circuitry suitable for use as the read address generator 22. The generator 22 is responsive to the zoom ratio signal, ZNR, and vertical position signal, VPOS, provided via the viewer controls 24, and to the horizontal synchronization signal, HS, and delayed vertical synchronization signal, DVS, to provide the line address signal RLADR used for the memory read operations. The read address generator 22 also provides a signal ZRL which contains the scale factors used by the vertical interpolation circuitry 28 and 32, a recirculate signal, RECIR, used by the luminance/chrominance separation circuitry 27, and a chrominance signal inversion signal, CINV, used by the chrominance signal vertical interpolation circuitry 32 as set forth below.

In order to understand the function of the circuitry shown in FIG. 4, it is helpful to first understand how successive lines of samples of the original video image are interpolated to obtain lines of samples representing the magnified image. The interpolation method used in this embodiment of the invention divides the space between any two successive lines in the original image into 525 potential interstitial line locations. The magnification factor used in this embodiment ranges from approximately 1 to 2, in steps of 1/256 (i.e. from 256/255 to 256/128). This relatively fine granularity in the magnification factor is desirable to produce the illusion of a continuous zoom when the magnification factor is changed. The fine granularity is more important for the spatial correctness of the entire image than for the proper interpolation of an individual line of samples or of an individual sample. It has been determined that the 255 potential interstitial line locations between any two successive lines may be grouped together into a smaller number of locations, for the purpose of interpolating an individual line of samples without seriously affecting the performance of the system. In the present embodiment of the invention, for example, the interval between two successive lines of samples is divided into nine potential interpolation positions.

FIGS. 10A through 10D are timing diagrams which illustrate how a line of samples is interpolated from a pair of successive lines to produce samples of the magnified image. FIG. 10A illustrates that the interval between successive lines of samples may be divided into 256 parts. FIG. 10B shows these 256 parts grouped together into nine interpolation positions. FIG. 10C is an example of how interpolation is performed using a factor of 256/144 (i.e. 1.78).

The position of individual lines of samples within the interpolation zones of FIG. 10B are determined by repeatedly adding the value 144 to the value held by a modulo 256 accumulator. The first addition produces a value of 144, placing the first interpolated sample in a zone where ⅝ of the line of samples, $L_1$, and ⅜ of the prior line of samples, $L_0$, are summed to develop the interpolated line of samples, $Z_1$. Adding 144 to the accumulator again yields a value of 32 (288 modulo 256). Using FIGS. 10B and 10C, the line of samples, $Z_2$, is formed by adding ⅛ of each sample in the line $L_2$ to ⅞ of the corresponding sample in the line of samples $L_1$. The lines of samples $Z_3$ through $Z_8$ are formed by repeatedly adding 144 to the accumulated value, modulo 256 and then using the relationship illustrated by the FIGS. 10B and 10C to determine which interpolation factors are to be used. FIG. 10D illustrates how the picture is magnified in the vertical direction when the interpolated lines of samples $Z_0$ through $Z_5$ are displayed with the same timing as the orginal lines of samples.

Referring to FIG. 4, the zoom ratio value, $E_R$, provided by the viewer controls 24 which in this embodiment of the invention may have a value between 128 and 255, is applied to one input port of an adder 410.

The adder 410 sums the value ZR with the value held by an eight-bit register 412. The register 412 may include, for example, eight data type flip-flops configured as a parallel-input-parallel-output register. The register 412 is clocked by the horizontal synchronization signal, HS, to store the eight-bit value provided by the adder 410 once per horizontal line period. The register 412 is reset by the delayed vertical synchronization signal, DVS. The adder 410 and register 412 form a modulo 256 accumulator. As set forth above, the output value provided by the accumulator is the position of the interpolated line from among the 256 potential horizontal line positions between any two successive lines of the original image. The output values of the accumulator are illustrated in FIG. 10C.

In the example illustrated in FIG. 4, only the four MSB's of the value provided by the register 412 are used in determining the proportions of the respective lines contributing toward the interpolated values. Using only the four MSB's effectively divides the value provided by register 412 by 16, thus, the range of values available are reduced from 0–255 to the range 0–15. The number represented by the four MSB's is the numerator r of the fraction r/16 which corresponds to the proportion of the contribution of the current line to the interpolated value.

The four MSB's are coupled to the four inverters 414, 416, 418 and 420 which produce the one's complement of the value of the four MSB's. The one's complement is equal to (15-r) and is the numerator of the fraction (15-r)/16 which corresponds to the proportion of the contribution of the previous line to the interpolated value.

The four MSB's of the value provided by the register 412 and the complemented four MSB's are concatenated as LSB's and MSB's respectively to produce values that are applied to a delay element 422. The delay element 422 is a synchronizing delay used to align the interpolation scale factors, ZRL, to the read line address signal, RLADR, and recirculate signal, RECIR. The values represented by the four LSB's of the signal provided by the delay element 422 are added to a value of one, provided by a digital value source 426 in an adder 424.

Adding a one to the LSB's and dividing by two (right-shifting and truncating the sum) produces the value r' which corresponds to the integer part of the eight-bit value provided by register 412 divided by thirty two, i.e. an integer value in the range 0–8. The value r' is the numerator of the fraction r'/8 and, thus, is equal to $8K_V$ where $K_V$ is the desired proportion of the contribution of the current line. The four MSB's of the signal provided by the delay element 422 (the ones-complement values) are added to a value of one provided by a digital value source 430 in an adder 428. The signal provided by the adder 428 is divided by two in the divider 434 to produce a signal $8(1-K)_V$ which represents the second vertical interpolation factor, multiplied by eight. The signal $8(1-K)_V$ is used by the vertical interpolation circuitry 28 and 32 to develop the interpolated lines of samples which represent the magnified image. The signal $8K_V$ is the four LSB's, and the signal $8(1-K)_V$ is the four MSB's of the signal ZRL. FIG. 10B illustrates how the factors $8K_V$ and $8(1-K)_V$ are mapped onto the 256 interstitial line positions between successive lines of samples.

A signal, $MSB_0$, representing the most significant bit of the value provided by the adder 410 and a signal MSB₁, representing the inverted most significant bit of the value provided by the register 412 are combined in a NAND gate 436 to produce a signal, which, when delayed by one horizontal line period by the delay element 438, becomes the recirculate signal RECIR. The signal provided by the NAND gate 436 has a logic zero value only when the most significant bit of the value provided by the register 412 is a zero and the most significant bit of the value provided by the adder 410 is a one. These values indicate that two successive interpolated lines of samples are to be interpolated from the same two lines of samples from the orginal image. Aternatively, the singal RECIR may be obtained by inverting an overflow output signal (not shown) provided by the adder 410 and delaying this inverted signal by two periods of the horizontal line synchronizing signal, HS.

The signal RECIR is applied to the clock input port of a toggle-type flip-flop 439. The flip-flop 439, which may be, for example, a conventional J-K flip-flop having a value of logic one applied to both its J and K input terminals, changes its output state from a logic one to a logic zero and vice-versa each time a pulse is applied to its clock input terminal, CLK. The flip-flop 439 is reset to have a logic zero output state by the delayed vertical synchronization signal DVS. The signal CINV changes state each time that two successive lines of interpolated signal are developed from one pair of lines of the original signal. The signal CINV controls the inversion of the chrominance samples developed by the chrominance signal vertical interpolation circuitry described below. This signal enables the chrominance signals developed by the circuitry 32 to be properly demodulated into the I and Q color difference signals by conventional chrominance signal demodulation circuitry.

The signal RECIR is applied to the luminance/chrominance separation circuitry 27 and to one input terminal of an AND gate 442. Another input terminal of the AND gate 442 is coupled to receive the horizontal synchronization signal HS. The signal provided by the AND gate 442 is applied to the clock input terminal of a counter 444 which produces the signal RLADR. The counter 444 increments its value once per horizontal line period unless the lines of samples used to generate the next interpolated line are the same as those that were used to generate the prior interpolated line. The counter 444 is cleared by the delayed vertical sync signal, DVS. The vertical position value VPOS is loaded as an initial value into the counter 444 by a delayed version of the signal DVS provided by the delay element 446.

The counter 444 is cleared and preset by the signal DVS to ensure that the lines of samples read from the field memory 16 during one field interval are all from the same field of the input video signal. For example, when a magnification factor of 256/128 (2) is used, memory write operations occur at twice the rate of the memory read operations. In the present embodiment of the invention, the field memory 16 holds 256 lines of samples. In this example, the image to be expanded occupies a portion of the lower one-half of the original image. Since the memory read operation is synchronized to the DVS, the first line to be expanded, line number 128 of the original signal, is read from the memory one horizontal line period after it was written into the memory. If the signal DVS were delayed by less than 128 horizontal line periods relative to the signal VS, the lines of samples displayed at the top of this expanded image would be from the previous field relative to the lines of samples displayed at the bottom of the image. Conversely, if the signal DVS were delayed by more than 128 horizontal line periods and a portion of the top half of the original image were magnified by a factor of 2, the lines of samples displayed at the bottom of the expanded image would be from the subsequent field relative to the lines of samples displayed at the top of the image. Displaying samples from a single field is desirable to avoid a "tearing" of the image which may occur because of interfield motion.

Figure 5:
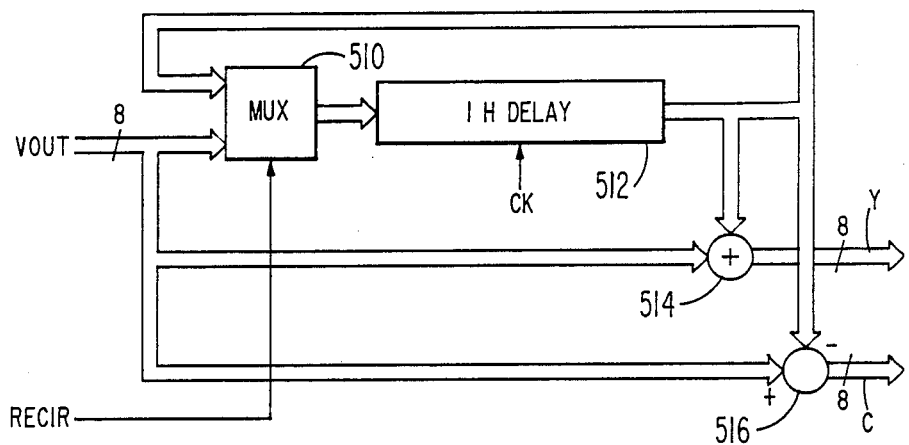
FIG. 5 is a block diagram of a luminance/chrominance separator suitable for use in the video signal processing circuitry shown in FIG. 1.

The recirculate signal RECIR generated by the read address generator 22 is applied to the luminance/chrominance separation circuitry 27. FIG. 5 is a block diagram of exemplary luminance/chrominance separation circuitry. The lines of samples of the video signal, VOUT, provided by the field memory 16 are applied to one input port of a multiplexer 510, the output port of which is coupled to a one horizontal line period (1H) delay element 512. The output signal provided by the 1H delay element 512 is applied to a second input port of the multiplexer 510. The control input terminal of the multiplexer 510 is coupled to receive the signal RECIR. When the signal RECIR is a logic one, the multiplexer 510 is conditioned to pass the signal VOUT to the 1H delay element 512. When the signal RECIR is a logic zero, however, the multiplexer 510 is conditioned to recirculate the samples provided by the 1H delay element 512 back to the input terminal of the delay element.

Figure 6:
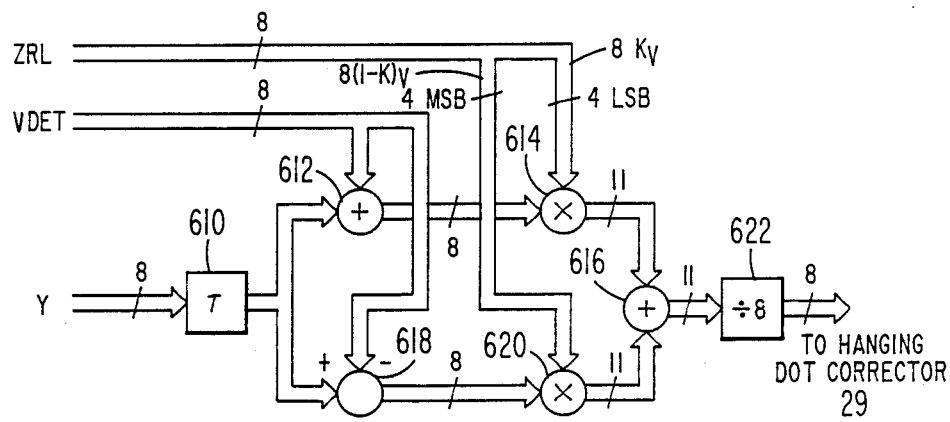
FIG. 6 is a block diagram of luminance signal vertical interpolation circuitry suitable for use in the video signal processing circuitry shown in FIG. 1.

The remainder of the circuitry shown in FIG. 5 implements a conventional 1H comb filter. Corresponding samples from a delayed line of samples and from an undelayed line of samples are summed in an adder 514 to provide a luminance signal, Y. The delayed samples are subtracted from the undelayed samples to produce a comb filtered chrominance signal, C, which includes chrominance signal components and relatively low frequency vertical detail signal components. The signal RECIR conditions the comb filter to use samples from the same pair of lines to erate the signals Y and C when two successive lines of the expanded video signal are to be interpolated from one pair of lines of the original video signal. The luminance signal, Y, provided by the luminance/chrominance separation circuitry 27 is applied to the luminance signal vertical interpolator 28. FIG. 6 is a block diagram of circuitry suitable for use as the interpolator 28.

In FIG. 6, the luminance signal Y is applied to a delay element 610. The delay element 610 compensates the luminance signal Y for processing delays through the chrominance signal vertical interpolator circuitry 32 (described below) that develops the vertical detail signal, VDET. An adder 612 and a subtracter 618 respectively add the vertical detail signal, VDET, to and subtract the signal VDET from the luminance signal provided by the delay element 610.

The signals developed by the adder 612 and subtracter 618 approximate the luminance signal components of two successive lines of the original video signal. The samples produced by the adder 612, which approximate the luminance samples from a current line of video signal, are multiplied, in a multiplier 614, by the interpolation scale factor $8K_V$ provided by the read address generator 22 via the bus ZRL. The output signals of the multiplier 614 are applied to one input port of an adder 616. The luminance signal provided by the subtracter 618, which approximates luminance samples from the previous line of video signal, is scaled by the interpolation scale factor $8(1-K)$ in a multiplier 620. The output signal of the multiplier 620 is applied to a second input port of the adder 616. The output signal of the adder 616 is divided by 8 in the circuitry 622 to produce the vertically interpolated luminance signal.

Referring to FIG. 1, the signal developed by the luminance signal vertical interpolation circuitry 28 is applied to hanging dot correction circuitry 29. The circuitry 29 which may, for example, be the same as that described in U.S. Pat. No. 4,636,842 entitled "Comb Filter 'Hanging Dot' Eliminator", which is hereby incorporated by reference, removes spurious chrominance signal components from the vertically interpolated luminance signal based on the magnitude of the vertical detail signal VDET. The circuitry 29 is described in the above referenced patent and, so, is not described herein.

Figure 7:
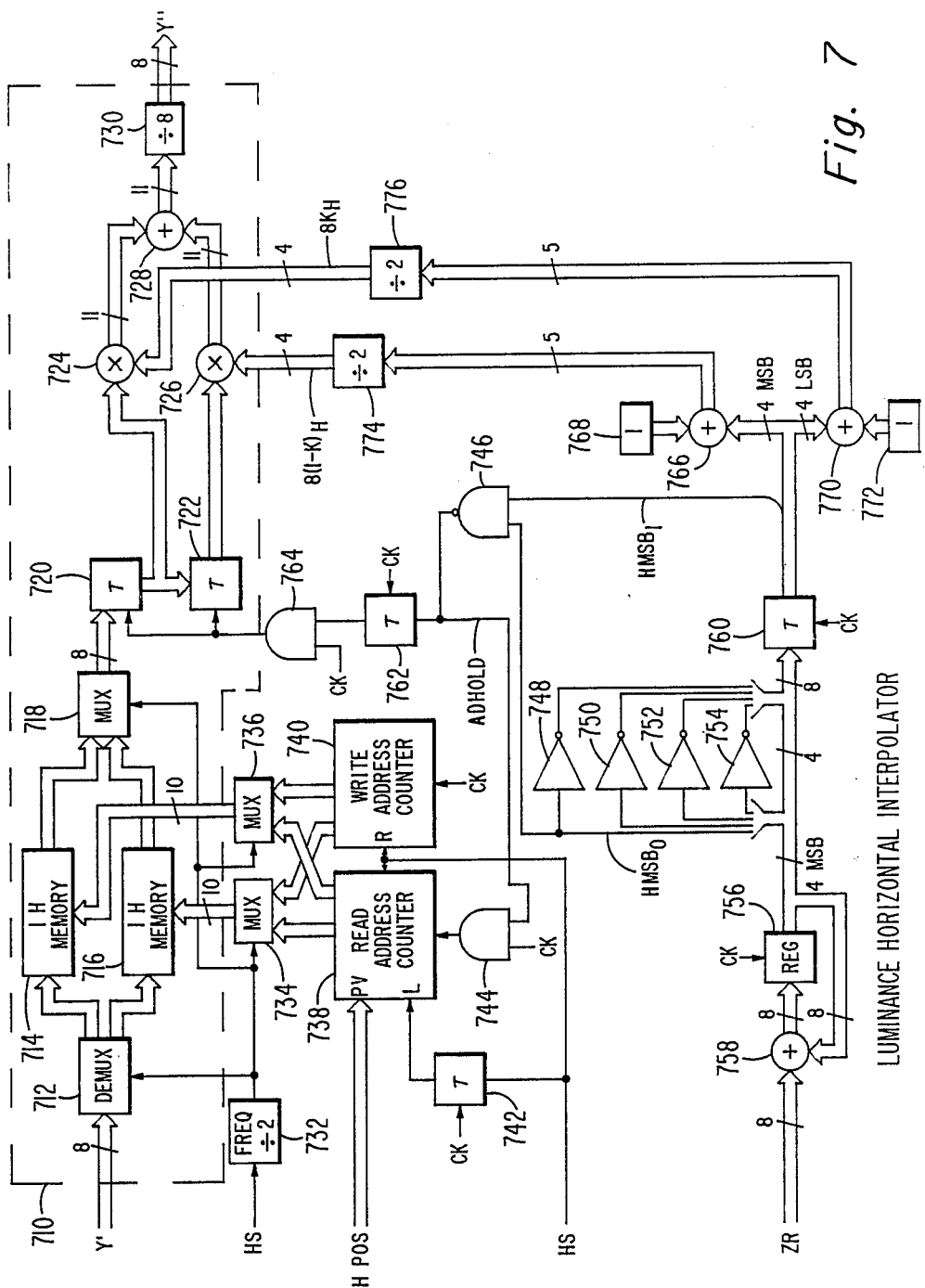
FIG. 7 is a block diagram of luminance signal horizontal interpolation circuitry suitable for use in the video signal processing circuitry shown in FIG. 1.

The signal Y' provided by the hanging dot correction circuitry 29 is applied to the luminance horizontal interpolation circuitry 30. The circuitry 30 interpolates samples for insertion between pairs of successive samples in each line of the signal Y' to develop the signal Y" which is expanded both vertically and horizontally relative to the video signal provided by source 10. FIG. 7 is a block diagram showing circuitry suitable for use as the luminance signal horizontal interpolator 30. The circuitry shown in FIG. 7 is divided into two parts. The circuitry which processes the signal Y' to produce the signal Y" is inside the dashed-line box, identified by the reference number 710. signal horizontal interpolation circuitry 34 as set forth below in reference to FIG. 9.

In FIG. 7, the vertically interpolated luminance signal, Y', is applied to the input port of a demultiplexer 712. The demultiplexer 712 applies the lines of samples of the signal Y' alternately to 1H random access memories 714 and 716. The signal controlling the demultiplexer 712 is generated by halving the frequency of the horizontal synchronization signal, HS, in the frequency dividing circuitry 732. The output ports of the memories 714 and 716 are coupled to respective first and second input ports of a multiplexer 718. The multiplexer 718 is controlled by the signal generated by the frequency divider 732 to provide samples from memory 714 when the demultiplexer 712 is conditioned to apply samples to the memory 716 and to provide samples from memory 716 when the demultiplexer 712 is conditioned to apply samples to the memory 714. The samples provided by the multiplexer 718 are applied to a delay element 720 which is controlled by a gated clock signal provided by an AND gate 764 as set forth below. The delay element 720 provides samples to a multiplier 724 and to a delay element 722. The delay element 722 is also clocked by the gated clock signal provided by the AND gate 764. The samples provided by the delay element 722 are applied to a multiplier 726. The multipliers 724 and 726, which may, for example, be conventional 8-bit×8-bit multipliers, scale the sample values provided by the respective delay elements 720 and 722 by interpolation factors $8K_H$ and $8(1-K)_H$ provided by dividing circuits 776 and 774, respectively. The scaled samples provided by the multiplying circuits 724 and 726 are summed in an adder 728 and divided by eight in sample value dividing circuitry 730 to produce samples representing the interpolated signal Y".

The circuitry that controls the interpolating circuitry 710 also develops the address values used to access the memories 714 and 716 and the interpolation scale factors used by the multipliers 724 and 726.

Each of the 1 H memories 714 and 716 is a random access memory. Address values used to access the memory 714 are provided by a multiplexer 736 while address values used to access the memory 716 are provided by the multiplexer 734. Each of the multiplexers 734 and 736 are coupled to receive read address values at respective first input ports from a read address counter 738 and to receive write address values at respective second input ports from a write address counter 740. The multiplexers 734 and 736 are conditioned by the signal provided by the frequency divider 732 to apply the write address values to the memory 714 or 716, whichever one is coupled to receive video samples from the demultiplexer 712, and to apply read address values to the other one of the memories 714 and 716.

The write address counter 740 may be, for example, a ten-bit counter which is clocked by the $4f_c$ signal CK and which is reset by the horizontal synchronization signal, HS. The read address counter 738 may also be a ten-bit counter which is clocked by a gated version of the signal CK provided by an AND gate 744 as set forth below. The counter 738, used in this embodiment of the invention, is a presettable counter. The horizontal position value, HPOS, provided via the viewer controls 24 is applied to the counter 738 as the preset value. This value is loaded into the counter 738 coincident with a pulse of the horizontal synchronization signal, HS, delayed by one period of the signal CK via the delay element 742.

The gated clock signal provided by the AND gate 744 is the logical AND of the clock signal CK and a signal ADHOLD provided by a NAND gate 746. The signal ADHOLD inhibits the read address counter 738 from incrementing when two successive interpolated samples are to be developed from a single pair of sample values of the signal Y'.

The circuitry which generates the signal ADHOLD also generates the horizontal interpolation scale factors used to develop the signal Y". As a first step in developing these factors, the zoom ratio signal, ZR, is applied to one input port of an adder 758. The output port of the adder 758 is coupled to the input port of an eight-bit register 756 which is clocked by the signal CK. The output port of the register 756 is coupled to a second input port the adder 758. The register 756, which may, for example, include eight data-type flip-flops arranged as a parallel-input, parallel-output register, and the adder 758 form a modulo 256 accumulator. The four MSB's of the value provided by the register 256 are applied to the input port MSB's of a delay element 760 both directly and via the respective inverters 748, 750, 752 and 754. The signal applied to the delay element 760 is an eight-bit signal. The four-bits provided by the inverters 748 through 754 are the four of this eight-bit signal and the four-bits provided by register 756 directly form the four LSB's of the signal. The signal $HMSB_0$, the most significant bit of the signal provided by the register 756, and the signal $HMSB_1$, the most significant bit of the signal provided by the delay element 760, are applied to the NAND gate 746 to generate the signal ADHOLD. The signal ADHOLD has a value of logic zero only when the signal $HMSB_0$ and $HMSB_1$ are both logic one. This occurs when the most significant bit of the value provided by the register 756 is a logic zero during one period of the signal CK and is a logic one during the next successive period of the signal CK. In this instance, two successive samples of the interpolated signal Y" are developed from one pair of samples of the signal Y'. Alternatively, the signal ADHOLD may be generated by inverting an overflow output signal (not shown) of the adder 758 and delaying this inverted output signal by two periods of the signal CK.

In addition to selectively disabling the clock input signal to the read address counter 738, the signal ADHOLD is delayed by one period of the signal CK, via the delay element 762, and applied to the input terminal of the AND gate 764. Another input terminal of the AND gate 764 is coupled to receive the clock signal CK. The signal provided by the AND gate 764 cycles successive samples of the signal Y' through the delay elements 720 and 722 for use by the interpolating multipliers 724 and 726. When the same two values of the signal Y' are used to develop two samples of the signal Y''', the clock signal applied to the delay elements 720 and 722 is disabled for one period of the signal CK. The samples provided by the delay elements 720 and 722 are processed by the multipliers 724 and 726 as set forth above.

To develop the horizontal interpolation scale factors, the values represented by the four LSB's of the signal provided by the delay elements 760 are added, in an adder 770, to a value of one supplied by a digital value source 772. The signal developed by the adder 770 is applied to a divider 776 which divides it by two to produce the horizontal interpolation factor $8K_H$. This factor is applied to the interpolating multiplier 724. Similarly, the values represented by the four MSB's of the signal provided by the delay element 760 are added, in an adder 766, to a value of one provided by a digital value source 768. The values developed by the adder 766 are divided by two in the dividing circuitry 774 to produce the horizontal interpolation factor $8(1-K)_H$. This factor is applied to the interpolating multiplier 726. The operation of the interpolating multipliers 724 and 726 is set forth above.

Figure 8:
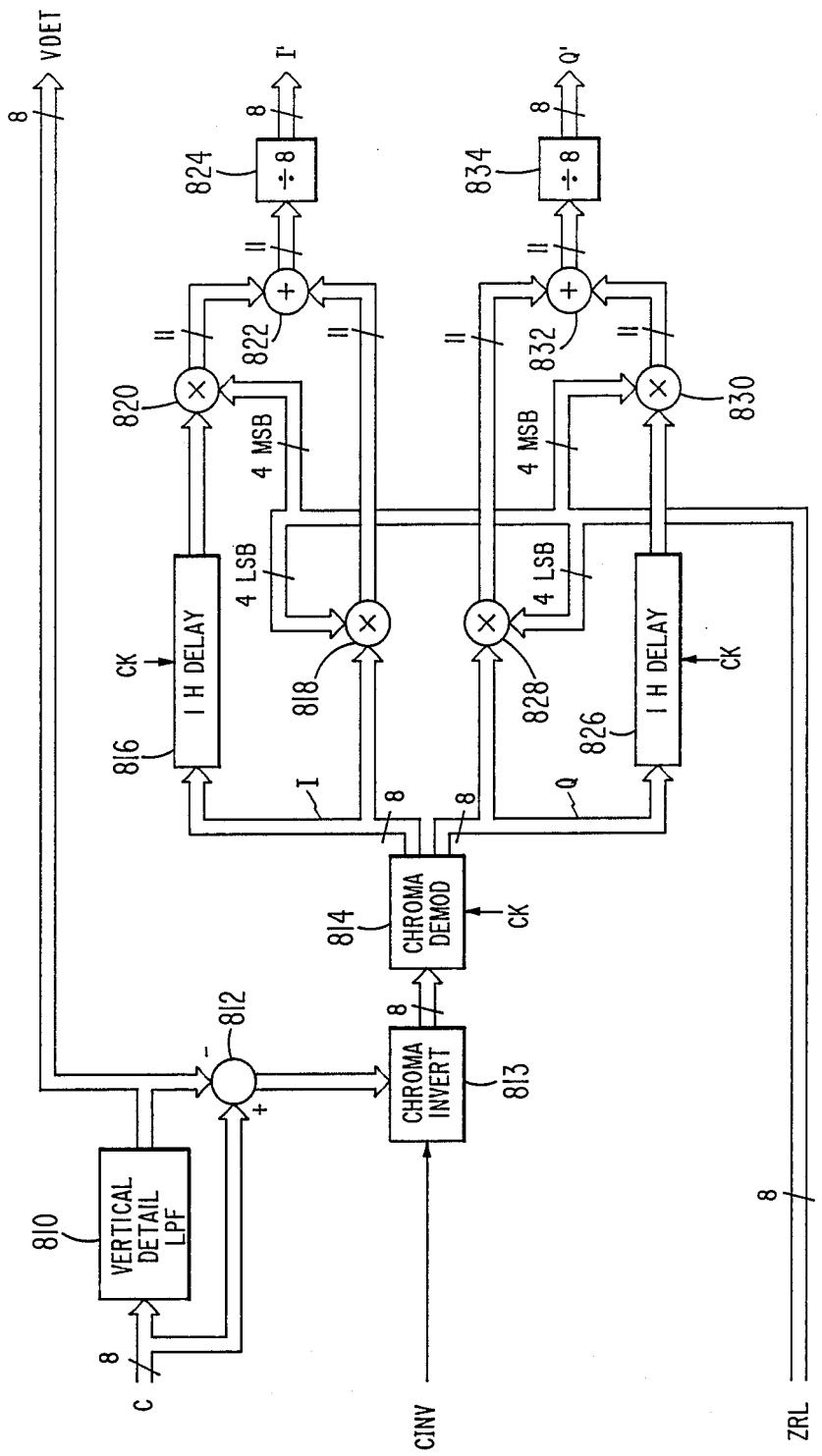
FIG. 8 is a block diagram of chrominance signal vertical interpolation circuitry suitable for use in the video signal processing circuitry shown in FIG. 1.

Referring to FIG. 1, the samples of the signal C provided by the luminance/chrominance separation circuitry 27 are applied to the chrominance vertical interpolator 32. FIG. 8 is a block diagram of circuitry suitable for use as the interpolator 32. In FIG. 8, the sampled data combed chrominance signal, C, provided by the separation circuitry 27 is applied to a vertical detail low-pass filter 810. The filter 810, which may, for example, have a frequency characteristic pass band from 0 H2 to 2 MHz passes the relatively low frequency luminance vertical detail components of the signal C to the substantial exclusion of any chrominance signal components. The filter 810 provides the vertical detail signal, VDET, which is used by the luminance signal vertical interpolation circuitry 28 as set forth above.

The signal VDET is subtracted from the signal C *by the subtracter 812 to produce samples representing the chrominance band signal components of the comb filtered chrominance singal C. The signals developed by the substracter 812 are appled to selective chrominace singal inverting circuitry 813. The circuitry 813 is controllled by the chrominance inversion signal, CINV, deeloped by the read address generator 22 as set forth above. The circuitry 813 acts to preserve the phase relationship between the clock signal CK and the I and Q phases of the vertically interpolated chrominance signal when successive lines of interpolated samples are derived from one pair of lines of the signal C. The phase corrected chrominace samples provided by the inverting circuitry 813 are applied to a chrominance signal demodulator 814. The demodulator 814, which may be of conventional design, processes these samples to develop the two color difference signals I and Q. The signal I is applied to a 1H delay element 816 and to a multiplier 818. The 1H delayed I signal provided by the delay element 816 is applied to a multiplier 820. The multiplexers 818 and 820, which may be, for example, conventional 8×8 bit multipliers, scale the respective undelayed and delayed I signal sample values by the spective interpolation scale factors $8K_V$ and $8(1-K)_V$ provided by the read address generator circuitry 22 as set forth above. The scaled samples provided by the multipliers 818 and 820 are summed in an adder 822. The signal provided by the adder 822 is divided by eight in the dividing circuitry 824 to produce vertically interpolated lines of samples of a signal I' for application to the color difference signal horizontal interpolation circuitry 34.

The Q color difference signals provided by the chrominance signal demodulator 814 are applied to circuitry which includes a 1H delay element 826, interpolating multipliers 828 and 830, an adder 832 and a sample value divider 834. This circuitry develops the vertically interpolated color difference signal, Q'. The Q signal the I signal vertical interpolation circuitry performs identically to vertical interpolation circuitry described above; consequently, it is not described in detail.

Using the chrominance signal vertical interpolation circuitry shown in FIG. 8, samples of a color difference signal from one line of the input video signal, for example, samples of the signal I, may be simultaneously provided to both of the interpolating multipliers 818 and 820. In this instance, which occurs for the second of two lines of samples interpolated from the same pair of lines of the input signal, the I' output signal of the interpolator 32 is the uninterpolated I signal. Due to the relatively low sensitivity of the eye to changes in color, artifacts resulting from the use of these uninterpolated samples are not objectionable. Moreover, because of the low sensitivity of the eye to changes in color, it is contemplated that the chrominance signal vertical interpolator circuitry 32 may be reduced to the vertical detail filter 810, subtracter 812, chrominance signal inverter 813 and chrominance signal demodulator 814; completely eliminating the 1H delay elements 816 and 826, the multipliers 818, 820, 826 and 828, the adders 822 and 832 and the sample value dividing circuits 824 and 834, without seriously impairing the quality of the reproduced image.

Figure 9:
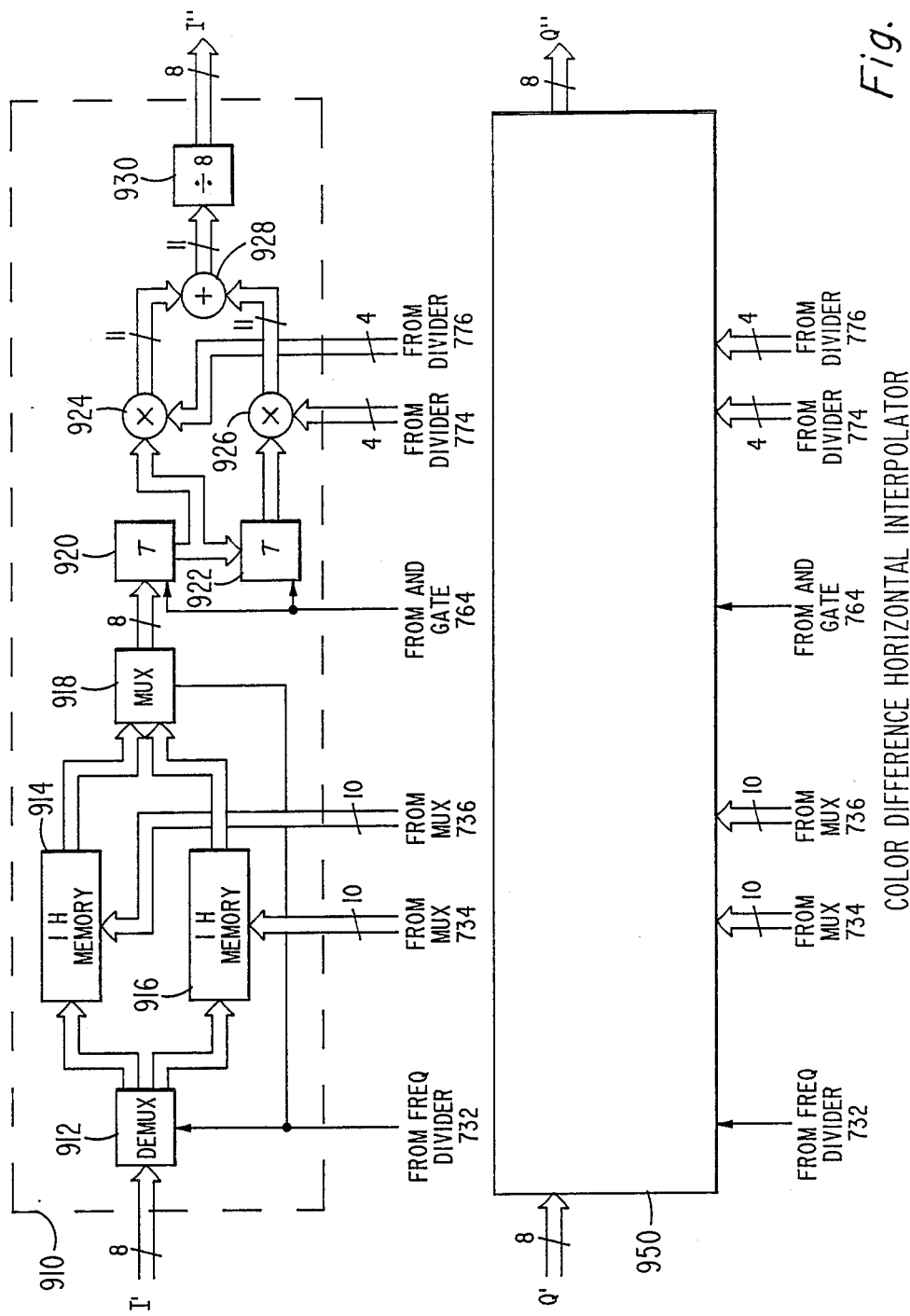
FIG. 9 is a block diagram of color difference signal horizontal interpolation circuitry suitable for use in the video signal processing circuitry shown in FIG. 1.

The vertically interpolated I and Q color difference signals provided by the circuits 32 are applied to color difference signal horizontal interpolation circuitry 34. FIG. 9 is a block diagram showing circuitry suitable for use as the horizontal interpolation circuitry 34. The circuitry 950 used to develop the interpolated Q color difference signal is identical to the circuitry used to develop the interpolated I color difference signal and, so, the circuitry 950 is shown as a single block. The circuitry, 910, used to develop the interpolated I color difference signal is, itself, identical to the circuitry 710 used to develop the horizontally interpolated luminance signals, accordingly, the circuitry 910 and the circuitry 950 are not described in detail. The horizontally and vertically interpolated color difference signals, I" and Q", provided by the respective circuits 910 and 950 may be applied, for example, to conventional color difference signal processing circuit (not shown) and combined with the signal Y" to produce a magnified image.

What is claimed is:

1. Circuitry for developing a magnified video image, comprising:
    a source of clock signal having a frequency substantially equal to a predetermined frequency;
    memory means for providing samples representing successive portions of an unmagnified image at instants determined by a memory output control signal;
    control signal generating means including:
        a source of digital value N where N is a positive number;
        modulo M digital value accumulating means, coupled to said source of digital value N and responsive to said clock signal for adding said digital value N to a stored digital value and for storing the resultant sum, modulo M, as said stored digital value; and
        memory output control signal generating means, coupled to said modulo M digital value accumulating means and responsive to the value of the sum developed thereby and to said clock signal for generating said memory output control signal, and
    sample processing means, coupled to said memory means and responsive to the samples provided thereby for generating samples representing said magnified video image at instants determined by said clock signal;
    wherein said magnified image is increased in size along a linear dimension by a factor of M/N relative to said unmagnified image.

2. The circuitry set forth in claim 1 wherein:
    said memory means includes:
        a random access memory, having an address input port, for holding samples representing the successive portions of said unmagnified image in respectively different memory locations corresponding to respective successive address values;
        address register means for holding an address value applied to the address input port of said random access memory; and
        address incrementing means, responsive to said memory output control signal for selectively incrementing the address value held in said address register means at instants determined by said clock signal; and
    said memory means provides said samples, representing portions of said unmagnified image corresponding to said address values applied to the address input port of said random access memory, at instants determined by said clock signal.

3. The circuitry set forth in claim 2 wherein:
    said control signal generating means further includes means for providing a signal substantially equal to an inverted version of a predetermined portion of the sum provided by said digital value accumulating means, delayed by one period of said clock signal; and
    said memory output control signal generating means includes means for generating said memory output control signal having a first state when the value of the predetermined portion of the sum developed by said digital value accumulating means and the value provided by said sample inverting and delaying means are within a predetermined range of values and having a second state otherwise;
    wherein the address incrementing means of said memory means is conditioned to increment the address value held in said address register means only when said memory output control signal is in said second state.

4. Circuitry for developing a magnified video image comprising:
    a source of clock signal having a frequency substantially equal to predetermined frequency;
    a source of sampled data video signal representing successive horizontal lines of a raster scanned video image;
    memory means, coupled to said source of sampled data video signal for storing samples representing one of ssaid horizontal lines at instants determined by said clock signal and for providing said stored samples at instants determined by said clock signal and a memory output control signal;
    control signal generating means including:
        a source of digital value N, where N is a positive number;
        modulo M digital value accumulating means, coupled to said source of digital value N and responsive to said clock signal, for adding said digital value N to a stored digital value and for storing the resultant sum, modulo M, as said stored digital value; and
        memory output control signal generating means, coupled to said modulo M digital value accumulating means and responsive to the value of the sum developed thereby and to said clock signal for generating said memory output control signal; and
    sample processing means, coupled to said memory means and responsive to the samples provided thereby for generating samples representing one horizontal line of said magnfied video image at instants determined by said clock signal;
    wherein a predetermined portion of the line of said magnified image is increased in size by a factor of M/N relative to the lines of the video image represented by the sampled data video signal provided by said source of sampled data video signal.

5. The circuitry set forth in claim 4 wherein:
    said sample processing means includes sample value interpolating means coupled to said memory means and responsive to an interpolation control signal for interpolating between pairs of successive sample values provided thereby to generate samples representing said one horizontal line of said magnified image; and
    said control signal generating means further includes interpolation control signal generating means responsive to the value of the sum provided by said digital value accumulating means for generating said interpolation control signal.

6. The circuitry set forth in claim 5 wherein:
    said memory means includes:
        a random access memory, having an address input port, for holding said samples, provided by said source of sampled data video signal, representing said one line of the raster scanned video image;
        address register means for holding an address value applied to the address input port of said random access memory; and
        address incrementing means, responsive to said memory output control signal for selectively incrementing the address value held in said address register means at instants determined by said clock signal; and said memory means provides said stored samples of said video signal corresponding to the address values applied to said address input port, at instants determined by said clock signal.

7. The circuitry set forth in claim 6, wherein:

the sum provided by said digital value accumulating means is a B-bit digital value where B is a positive integer such that $2^B = M$;

said interpolation control signal generating means includes means, coupled to said digital sample value accumulating means, for inverting the R most significant bits of the sum provided by said digital value accumulating means where R is an integer less than B, and delay means coupled to said inverting means, for delaying said R inverted most significant bits by an amount of time substantially equal to one period of said clock signal; and said memory output control signal generating means includes first gating means for forming an inverted logical AND of the most significant bit of the B-bit sum provided by said accumulating means and the most significant bit of the R-bit value provided by said delay means, and second gating means for forming a logical AND of said clock signal and the values provided by said first gating means, to produce said memory output control signal.

* * * * *

UNITED STATES PATENT AND TRADEMARK OFFICE
CERTIFICATE OF CORRECTION

PATENT NO. : 4,774,581

DATED : September 27, 1988

INVENTOR(S) : Shinichi Shiratsuchi

It is certified that error appears in the above-identified patent and that said Letters Patent is hereby corrected as shown below:

Column 4, line 55, "OLB" should be --$\overline{OLB}$--.

Column 5, line 5, "21" should be --210--.

Column 6, line 65, "ZNR" should be --ZR--.

Column 7, line 17, "525" should be --255--.

Column 9, line 12, "Ater-" should be --Alter--.

line 13, "singal" should be --signal--.

Column 11, line 30, after "71Q" insert --The remainder of the circuitry shown in FIGURE 7 controls the circuitry 710 and also controls the color difference--.

Column 12, line 50, delete "MSB's".

line 54, after "four" insert --MSB's--.

Column 13, line 53, delete "*".

line 56, "singal" should be --signal--.

line 58, "singal" should be --signal--.

line 60, "deeloped" should be --developed--.

Column 14, line 9, "spective" should be --respective--.

line 23, delete "the I".

line 24, delete "signal"

line 25, after "to" insert --the I signal--.

UNITED STATES PATENT AND TRADEMARK OFFICE
CERTIFICATE OF CORRECTION

PATENT NO. : 4,774,581

DATED : September 27, 1988

INVENTOR(S) : Shinichi Shiratsuchi

It is certified that error appears in the above-identified patent and that said Letters Patent is hereby corrected as shown below:

Column 14, line 66, "circuit" should be --circuits--.

Signed and Sealed this

Eighteenth Day of July, 1989

Attest:

DONALD J. QUIGG

Attesting Officer

Commissioner of Patents and Trademarks